United States Patent
Padmanabhan

(10) Patent No.: US 6,558,765 B2
(45) Date of Patent: *May 6, 2003

(54) METHOD OF MANUFACTURING COMPOSITE WOOD FLOORING

(75) Inventor: Gopalkrishna Padmanabhan, St. Louis, MO (US)

(73) Assignee: Havco Wood Products L.L.C., Scott City, MO (US)

( * ) Notice: Subject to any disclaimer, the term of this patent is extended or adjusted under 35 U.S.C. 154(b) by 132 days.

This patent is subject to a terminal disclaimer.

(21) Appl. No.: 09/732,265

(22) Filed: Dec. 7, 2000

(65) Prior Publication Data

US 2001/0035264 A1 Nov. 1, 2001

Related U.S. Application Data

(63) Continuation of application No. 09/356,856, filed on Jul. 19, 1999, now Pat. No. 6,179,942, and a continuation-in-part of application No. 09/294,476, filed on Apr. 20, 1999, now Pat. No. 6,183,824, which is a continuation-in-part of application No. 08/484,364, filed on Jun. 7, 1995, now Pat. No. 5,928,735.

(51) Int. Cl.$^7$ .............................. B32B 3/00; B32B 21/08

(52) U.S. Cl. .............................. 428/54; 428/55; 428/58; 428/77; 428/297.4; 428/298.1; 428/299.1; 428/299.4; 428/511; 428/537.1; 442/413; 156/325; 156/326; 156/327; 156/331.7

(58) Field of Search .................................. 156/325, 327, 156/331.7, 326; 428/537.1, 485, 532, 413, 507, 511, 528, 225, 228, 227, 232, 298.1, 299.1, 299.4, 33, 55, 58, 77, 297.4, 297; 442/413

(56) References Cited

U.S. PATENT DOCUMENTS

| 2,537,343 A | 1/1951 | Golick et al. ............ 428/478.4 |
| 2,588,580 A | 3/1952 | Scruggs ...................... 156/291 |

(List continued on next page.)

FOREIGN PATENT DOCUMENTS

JP 06280375 10/1994

OTHER PUBLICATIONS

"Prestressed FRP Sheets As External Reinforcement of Wood Members" by Thanasis C. Triantafillou and Nikola Deskovic; *Journal of Structural Engineering*, vol. 118. No. 5, May 1992, pp. 1270–1284.

"A Feasibility Study For Strengthening Timber Beams With Fibreglass" By F.H. Theakston; *Canadian Agricultural Engineering*, Jan. 1965, pp. 17–19.

*Primary Examiner*—Paul Thibodeau
*Assistant Examiner*—Monique R. Jackson
(74) *Attorney, Agent, or Firm*—Ohlandt, Greeley Ruggiero & Perle L.L.P.

(57) ABSTRACT

A fiber reinforced composite wood board is designed particularly for use in the flooring of truck trailers which experience adverse operating conditions such as from heavy loads of lift trucks on the top side and water spray during rainy periods on the bottom side. The composite wood board comprises an edge-glued laminated wood member composed of wood segments with end joints. The wood member is underlaid with a thin layer of fiber reinforced plastic. The top surface of the composite wood board is the same as that of the laminated wood. The fiber reinforced plastic underlay is composed of glass and/or carbon fibers embedded in a polymeric resin such as epoxy, phenolic, vinyl ester, polyester, polypropylene or polyamide resin. Further, the fiber reinforced plastic underlay is substantially bonded to the wood member with a reactive hotmelt adhesive. The fiber reinforced plastic provides high fatigue resistance to the composite wood board and prevents water leakage into the trailer through the end joints of the wood segments.

38 Claims, 6 Drawing Sheets

U.S. PATENT DOCUMENTS

| | | | |
|---|---|---|---|
| 3,037,900 A | 6/1962 | Hings et al. | 156/310 |
| 3,315,380 A | 4/1967 | Mack, III et al. | 36/19.5 |
| 3,681,883 A | 8/1972 | Ehrlich | 52/220 |
| 3,751,864 A | 8/1973 | Berger et al. | 52/79 |
| 3,848,284 A | 11/1974 | Livingston | 9/6 |
| 4,083,743 A | 4/1978 | Degens | 156/278 |
| 4,158,712 A | 6/1979 | Degens | 428/212 |
| 4,158,713 A | 6/1979 | Degens | 428/212 |
| 4,180,413 A | 12/1979 | Diederich | 156/185 |
| 4,188,445 A | 2/1980 | Hill | 428/246 |
| 4,288,957 A | 9/1981 | Meehan | 52/460 |
| 4,307,883 A | 12/1981 | Kelly | 273/51 |
| 4,378,402 A | 3/1983 | Below | 428/247 |
| 4,443,520 A | 4/1984 | Braithwaite | 428/438 |
| 4,489,121 A | 12/1984 | Luckanuck | 428/192 |
| 4,500,387 A | 2/1985 | Embury | 156/499 |
| 4,526,418 A | 7/1985 | Martin | 296/182 |
| 4,528,231 A | 7/1985 | Lund | 428/148 |
| 4,620,892 A | 11/1986 | Dodson et al. | 156/319 |
| 4,674,745 A | 6/1987 | Speranza | 273/51 |
| 4,706,424 A | 11/1987 | Garapick et al. | 52/181 |
| 4,735,851 A | 4/1988 | Dodson et al. | 428/326 |
| 4,801,483 A | 1/1989 | Beckerman et al. | 428/71 |
| 4,904,328 A | 2/1990 | Beecher et al. | 156/272.2 |
| 4,913,485 A | 4/1990 | Moffatt et al. | 296/190 |
| 4,938,265 A | 7/1990 | Mountz | 144/347 |
| 5,054,843 A | 10/1991 | Gray | 296/191 |
| 5,055,156 A | 10/1991 | Marino et al. | 156/499 |
| 5,059,472 A | 10/1991 | Le Bell et al. | 428/161 |
| 5,106,446 A | 4/1992 | Beck et al. | 156/331.7 |
| 5,135,598 A | 8/1992 | Kobe et al. | 156/273.3 |
| 5,135,793 A | 8/1992 | Socha | 428/74 |
| 5,143,418 A | 9/1992 | Fouquet | 296/182 |
| 5,153,058 A | 10/1992 | Hall et al. | 428/319.7 |
| 5,166,302 A | 11/1992 | Werner et al. | 528/67 |
| 5,190,607 A | 3/1993 | Werner et al. | 156/331.1 |
| 5,362,545 A | 11/1994 | Tingley | 428/96 |
| 5,407,517 A | 4/1995 | Hansel et al. | 156/331.7 |
| 5,498,460 A | 3/1996 | Tingley | 428/96 |
| 5,501,054 A | 3/1996 | Soltis et al. | 52/730.7 |
| 5,509,715 A | 4/1996 | Scharpf | 296/181 |
| 5,599,895 A | 2/1997 | Heider | 528/59 |
| 5,603,798 A | 2/1997 | Bhat | 156/331.4 |
| 5,710,215 A | 1/1998 | Abend | 525/124 |
| 5,776,406 A | 7/1998 | Schubert et al. | 264/328.1 |
| 5,827,393 A | 10/1998 | Kinzelmann et al. | 156/308.2 |
| 5,866,656 A | 2/1999 | Hung et al. | 525/123 |
| 5,928,735 A * | 7/1999 | Padmanabhan et al. | 428/33 |
| 6,037,049 A * | 3/2000 | Tingley | 428/299.1 |
| 6,179,942 B1 * | 1/2001 | Padmanabhan | 156/153 |
| 6,183,824 B1 * | 2/2001 | Padmanabhan et al. | 428/33 |

* cited by examiner

METHOD OF MANUFACTURING COMPOSITE WOOD FLOORING

RELATED APPLICATION

This application is a continuation of copending application Ser. No. 09/356,856 U.S. Pat. No. 6,179,942 filed Jul. 19, 1999 which is a continuation-in-part of application Ser. No. 08/484,364 U.S. Pat. No. 5,928,735 filed Jun. 7, 1995 and application Ser. No. 09/294,476 U.S. Pat. No. 6,183,824 filed Apr. 20, 1999.

BACKGROUND OF THE INVENTION

This invention relates to an improved laminated wood flooring for truck trailers and containers. Fiber reinforced polymer composite materials are used in conjunction with edge-glued laminated wood members to provide improved mechanical properties, moisture protection, fatigue resistance and light weight to the resulting composite boards for use in flooring of vehicular trailers.

Conventional wood flooring for over-the-road truck trailers and containers is normally manufactured with hardwoods such as oak, maple, birch, beech, etc. The green lumber used as a starting material in such manufacture is suitably dried in special drying chambers under controlled conditions. The dried lumber is then sawed into strips of rectangular cross-section and defective portions are eliminated by cross cutting the strips. During the crosscutting process, "hooks" are formed at the ends of the lumber strips. The relatively defect-free lumber strips are coated on their vertical sides or edges with an adhesive such as urea-melamine formaldehyde or polyvinyl acetate. The uncured edge-glued lumber strips are then assembled on a conveyor by placing them side to side and behind other strips, which were previously assembled. Applying heat and edge pressure to large sections of the assembled lumber strips cures the adhesive thus forming a unitary panel. During the assembly of the lumber strips, "hook joints" are formed at each end of every lumber strip. These joints are simple mechanical couplings between the mating hook ends of opposing lumber strips without significant adhesive bonding at the joint itself. Often times, due to imperfect assembly, a readily visible gap is formed at the hook joints, which can be seen from the top and bottom surfaces of the finished laminated wood floor.

The cured laminated wood is cut to a desired length (up to about 60 feet) and width (about 6 to 18 inches) to form boards. The boards are then planed to a desired thickness and shiplaps and crusher beads are machined on its sides. A shiplap is a rectangular projecting lip running along the length on each side of a floor board. The crusher bead is a small semi-circular projection running along the length on each side of a board and placed over or below a lip. When the floor boards are assembled in a trailer such that the side edges of corresponding boards are squeezed together, the shiplaps of adjacent boards overlap to form a seam. The crusher beads provide spacing between adjacent boards and help in preventing buckling of the boards due to expansion on absorption of water. A wood putty is applied at the hook joints on the top and bottom surfaces of the boards to fill any resident gaps. Finally, the underside of the floor boards is coated with a polymeric substance termed as "undercoating" to provide moisture protection. The finished floor boards are assembled into a kit of about eight boards for installation in trailers. Normally, a kit consists of two boards with special shiplaps so that they will fit along the road and curb sides of a trailer. The other boards may be identical in design and they are placed between the road and curb side boards. In some trailers, a metallic component such as a hat-channel may be placed between any two adjacent boards. The metallic component becomes part of the floor area. The boards adjacent to the hat-channel have shiplaps designed to mate with the flanges of the metallic component. All the boards are supported by thin-walled cross-members of I, C or hat sections, each having an upper flange, which span the width of the trailer and are spaced along the length of the trailer. Each floor board is secured to the cross-members by screws extending through the thickness of the board and the upper flanges of the cross-members.

Hardwood-based laminated wood flooring is popularly used in truck trailers since it offers many advantages. The surface characteristics of hardwoods such as high wear resistance and slip resistance are most desirable. The strength and stiffness of the flooring is important for efficient and safe transfer of the applied loads to the cross-members of the trailer. The shock resistance of wood is useful to withstand any sudden dropping of heavy cargo on the floor. Nail holding capability and ability to absorb small amounts of water, oil or grease without significantly affecting slip resistance are yet additional favorable properties of hardwood flooring.

Although the conventional wood flooring has many desirable features, it also suffers from certain disadvantages. For example, water from the roads is known to leak into trailers through the gaps of the hook joints that exist in the flooring. The reasons for the water leaks are believed to be the capillary action of the gaps and the tendency of the end grain of wood to absorb and store water. Although the undercoating is supposed to provide a barrier to the path of water, it may not properly cover larger gaps thus exposing them to moisture. Wetting and drying cycles can degrade the undercoating leading to its cracking and peeling away from the wood. Bending of the floor between two adjacent cross-members due to any applied load on the top of the floor also has a tendency to open the hook joints and enlarge the gaps.

A lift truck is often used on the trailer floor to load and unload cargo. The dynamic action of a moving lift truck placing heavy cargo on the trailer floor creates severe stress concentration in the flooring and some of the cross-members. A very large amount of the weight of the lift truck and that of the cargo is transferred to the flooring through the wheels of the front axle of the lift truck due to the momentary raising of the rear axle when the lift truck is dynamically placing a heavy cargo on the floor. The effect of repeated lift truck operation on the conventional wood floor causes considerable fatigue damage including: delamination of the edge glued lumber strips near the hook joints leading to the "pop-out" of the lumber strips; crack initiation and propagation in wood on the underside of the floor due to tensile stresses; and cracking of edge glue lines due to shearing, transverse bending and twisting of the floor. The combination of moisture attack and fatigue damage to the wood floor affects its performance thus necessitating its repair or replacement. In some cases, catastrophic structural failure of the trailer floor system may occur leading to the unacceptable injury to working personnel and damage to machinery.

To alleviate the above-mentioned problems, novel fiber reinforced composite wood flooring was designed, tested and refined to be an improvement over conventional wood flooring. This new composite wood flooring consists of conventional laminated wood member with an underlay of fiber reinforced plastic (FRP) bonded to the wood member. The top surface of the composite wood flooring is essentially the same as that of the conventional wood flooring. Since the FRP is impervious to the passage of water, it completely seals the bottom of the wood member and solves the problem of leaky hook joints. The fiber reinforcement improves the mechanical properties of the flooring and therefore the thickness of the laminated wood can be reduced. Thus, thinner and lighter composite wood flooring can be produced with equivalent strength when compared to thicker conventional wood flooring. Since the reinforcement provides an excellent barrier to the "pop-out" of lumber strips, the fatigue resistance of the composite wood flooring can be improved over that of the conventional wood flooring.

Technologists are constantly trying to find ways to improve the mechanical properties, reduce weight and improve moisture resistance of wood flooring. Fouquet, U.S. Pat. No. 5,143,418 describes the use of composite plywood panels as flooring in truck trailers. The plywood was composed of veneers of wood with a majority of the veneers oriented with the wood grain along the longitudinal direction while the remaining veneers were oriented with the wood grain along the transverse direction. The top and bottom surfaces of the plywood panels were overlaid with resin impregnated cellulose sheets for providing moisture and slip resistance. Clearly, Fouquet has not considered a floor design involving the FRP to provide higher strength and moisture protection.

Another area of related art is the use of FRP to improve the mechanical properties of structural wood members, such as beams, columns and trusses. Theakston (Canadian Agricultural Engineering, January 1965, Pages 17–19) has discussed the use of glass fibers and epoxy resin to reinforce laminated timber beams and arches. Triantafillou and Deskovic (Journal of Structural Engineering, Vol. 118, No. 5, May 1992, Pages 1270–1284) have published test results on the reinforcement of structural wood beams by adhesively bonding prestressed carbon fiber based FRP panels using epoxy adhesive. Thus the concept of reinforcing structural wood members (especially beams) with FRP has been known for several decades. Tingley, U.S. Pat. No. 5,362,545 describes the use of a resorcinol adhesive to bond certain special composite panels to glue-laminated wood beams (Glulams). The special composite panels containing aramid (Kevlar®) fiber reinforcement are abraded by sanding prior to bonding. The sanding process makes the panel "hair up" due to Kevlar and helps to obtain improved bonding with wood. The Tingley patent teaches the utility of Kevlar in FRP panels to improve the bond strength of the FRP to wood while using a resorcinol adhesive.

The above-referenced patents and publications have not addressed the construction and related benefits of reinforced laminated wood flooring for use in truck trailers. The advantages of reinforcing the bottom side and disadvantages of reinforcing the top side of the laminated wood boards are not disclosed in these references. The publications do not discuss the remedies for the problems associated with the conventional wood flooring such as water leakage through the hook joints and fatigue damage due to lift truck traffic on the floor. There is no discussion in the publications regarding the type of reinforcements and resins that are suited for the fabrication of reinforced composite wood flooring. For example, the question of whether fiber reinforcement along the width (transverse) direction of the floor is advantageous is not addressed in these publications. A reinforced composite wood flooring construction such as that provided by the present invention which is suitable for lift truck movement and also for carrying cargo in a trailer has never before been invented.

Methods of manufacturing the reinforced composite wood boards to construct the improved flooring have never been considered before. The manufacturing process needs to be able to produce the composite wood boards at a fairly high speed to meet the demands of volume and cost effectiveness. The conventional laminated wood boards are typically manufactured at a rate of about 1500 to 2000 sq ft/hr using one set of machinery. To be competitive, composite wood boards need to be produced at a similar production rate. Since dissimilar materials with mismatch of physical properties are bonded together to manufacture composite wood boards, precaution has to be taken to ensure the flatness of the board after the bonding is completed. The adhesive used to bond the FRP and wood member should not excessively leak under the bonding pressure. Squeeze-out of adhesive can contaminate the surfaces of the substrates requiring additional clean-up operation. The bond between the FRP and wood member needs to be strong enough to resist the stress concentration around the hook joints and also be fatigue and moisture resistant.

SUMMARY OF THE INVENTION

Unlike the FRP-wood structural beams, the reinforced composite wood flooring of the present invention is designed to provide several desirable features. The composite wood floor consists of a plurality of composite wood boards. The top side of each of the composite wood boards is composed of a laminated wood member with a construction similar to that of conventional wood boards of trailer flooring. This provides a high coefficient of friction and slip resistance, thereby facilitating the safe movement of man and machine. The surface of wood can also absorb small amounts of water that may spill over it. Any oil or grease that spills on the wood surface can be wiped off and the left over slick is absorbed by the pores of wood as in the conventional wood flooring. On the contrary, even an extremely thin coating of oil on FRP can render it dangerously slippery and therefore, FRP is not laid on the top side of the composite wood board. An FRP is bonded to the bottom side of the laminated wood member to provide protection to wood from the outside environment. The FRP underlay of the composite wood flooring eliminates the need for a polymeric undercoating and for puttying of hook joints that is required in the conventional wood flooring. In fact, the need for hook joints themselves can be eliminated; that is, the lumber strips can be joined at butt ends thereof or by finger or lap and gap joints. However, the use of hook joints is preferred. The gaps in the hook joints are completely sealed by the FRP, thus preventing water leakage into the trailer through the flooring.

Preferably, the FRP is fabricated with glass fibers and an epoxy resin. Other reinforcements such as carbon and aramid fibers and other thermosetting resins such as vinyl ester, polyester, phenolic resins and the like and other thermoplastic resins such as polypropylene and polyamide resins and the like can also be used to fabricate the FRP. The glass fiber reinforcement provides an economical means of increasing the strength of the flooring in the longitudinal and transverse directions. The epoxy resin binds the glass fibers together and protects the fibers from adverse environment. The reinforcing fibers resist the pop-out of the lumber strips of composite wood floor in trailers when subjected to the fatigue loads of heavy lift trucks. The transverse reinforcement resists the splitting of the FRP and delamination of edge-glue lines in laminated wood during the application of shearing, twisting and transverse bending loads on the floor. Thus, our design of the composite wood floor provides improvements in the prevention of moisture leakage through hook joints, maintains the desirable surface characteristics of the wood on the top surface and also provides significant improvements in fatigue resistance at lower weight.

The manufacture of the composite wood boards can be accomplished by means of a suitable process wherein the fiber reinforced plastic is bonded to the surface of laminated wood member. In a wet process, the fiber reinforcement is saturated with a reactive liquid polymeric resin. The resin-wetted reinforcement is placed in contact with the surface of the laminated wood and the resin is cured under heat and pressure. A hotpress can be used to apply heat and pressure on the resin-wetted reinforcement while it is still in contact with the laminated wood. The composite wood board can also be manufactured by adapting the pultrusion process, which normally involves the pulling of resin-wetted reinforcement through a stationary heated die where the FRP is shaped and the resin is cured. The laminated wood and the resin-wetted reinforcement can be pulled together through a heated die to produce composite wood board. In the wet processes as described above, it is possible to use the same resin to bind the fibers together or form the matrix of the FRP and also to bond the fibers to the wood member.

In the above-mentioned processes, which uses liquid resins several practical problems are encountered. The simultaneous application of heat and pressure to consolidate and cure the resin-wetted reinforcement leads to squeeze-out of the resin. The applied temperature reduces the viscosity of the resin further compounding the squeeze-out of resin. The squeeze-out of the resin can occur at the sides of the layer of the wetted reinforcement or through the hook-joints of the wood member, since gaps are present at many of these joints. The composite board formed with the squeeze-out of resin needs a significant degree of subsequent machining to provide the required dimensions and shape of shiplaps along the longitudinal edges. Further, the FRP layer, which is formed under heat and bonded to a wood member under heat tends to shrink as it cools down. Due to unsymmetrical construction of the composite board with FRP bonded to one surface of a wood member and difference in the thermal expansion coefficients of wood and FRP, the composite wood board formed by heating the resin wetted reinforcements tends to warp on cooling. Typically, the composite board develops a bowed shape along the length of the board. For truck-trailers, the floor boards need to be substantially flat for easy installation and use.

In order to overcome the problems of squeeze-out of the resin and warping of the boards due to heating of the FRP for curing the resin, it is better to adhesively bond a prefabricated FRP sheet to the wood member with minimal application of heat to the FRP and wood. A suitable prefabricated FRP sheet can be bonded to laminated wood using thermosetting or thermoplastic adhesives. Thermosetting adhesives include epoxy, polyurethane, phenol-resorcinol formaldehyde, urea-melamine formaldehyde, etc. Thermoplastic adhesives include hotmelts such as ethylene vinyl acetate polymers (EVA), polyamide, etc. Experiments have shown that thermosetting liquid adhesives can be used to fabricate composite wood floor. However, squeeze-out of the adhesive through the hook joints of the wood member continues to be a problem when heat and pressure are applied. Further, application of excessive amount of heat through the FRP to quickly cure the adhesive leads to warping of the board as mentioned before. Even though the use of thermoplastic hotmelt adhesives such as EVA in bulk form or films eliminate squeeze-out, they do not lead to sufficient bond strength to resist the pop-out of the lumber strips at the hook joints. Thermoplastic hotmelt adhesives with relatively high strength can provide the required performance. After several experiments and extensive testing, reactive hotmelt adhesive has been determined to be the best choice to bond prefabricated FRP to wood members to manufacture composite wood boards. This method offers high speed of production with minimal application of heat and good bonding of the FRP to wood members to resist the opening of the hook joints under load along with little or no squeeze-out of the adhesive during production.

Reactive hotmelt adhesives behave like a typical non-reactive hotmelt adhesive during processing or bonding, but subsequently undergo chemical reactions with moisture to transform into a cross-linked thermosetting adhesive. By means of cross-linking, the molecular weight of the adhesive increases thus providing higher bond strength and hygrothermal resistance. Reactive hotmelt adhesives are solvent free solids at room temperature. They are melted by heating and then applied on the bondable surface of the substrates by means a roller coater. Typically, only one substrate needs to be coated in order to bond to another uncoated substrate. However, both substrates may be coated, if required. After coating one or both substrates with the reactive hotmelt adhesive, the substrates are joined and pressed together by a platen press or by means of rollers. The joined and pressed parts are allowed to cure for 1 to 7 days before use.

Reactive hotmelt adhesives are highly suited to the bonding of prefabricated FRP sheets to wood members for manufacturing composite flooring for trailers. The adhesive is the only component that needs to be heated to about 200° F. to 350° F. for the bonding process. The bonding surfaces of the wood board and FRP need to be warmed up to about 60° F. to 200° F., if required. Since the FRP is not substantially heated for curing its polymer, the quantity of heat required for the bonding process is minimized. This leads to the production of substantially flat boards with little or no warping after bonding. Since the reactive hotmelt is used and applied as a traditional hotmelt, it leads to high manufacturing speed. The cross-linking of the reactive hotmelt provides higher hygrothermal resistance and therefore, the composite floor can perform well under the harsh environment of the roadways. Since the reactive hotmelt has a fairly high strain to failure, it develops high peel strength, which is particularly important to reinforcing the hook joints of the wood member. When a typical brittle adhesive with a low strain to failure is used in this application, it leads to debonding of the FRP from the wood board at the regions of high stress surrounding the hook joints under an applied load on the floor board. These debonds can grow due to fatigue loads of lift truck on the floor of a trailer, leading to large-scale failure. However, the reactive hotmelt has been shown to work very well under fatigue loading in our testing and experiments. Due to a number of advantages as stated above, both in processing and performance of composite wood flooring, reactive hotmelt has been determined to be the preferred adhesive for this application. The use of a reactive hotmelt for bonding prefabricated FRP to wood members with hook joints, in order to improve its strength, stiffness, fatigue resistance and water proofing ability for use in vehicular trailer flooring has never been published before. Any suitable reactive hotmelt adhesive may be employed in the process of this invention.

The FRP sheet can be produced by pultrusion and continuous lamination processes. In the pultrusion process, the resin-wetted reinforcements are pulled under tension through a stationary heated die where the FRP is shaped and cured. In continuous lamination process, reinforcements are wetted with a polymeric resin. The wetted reinforcements are aligned in a die and then cured in an oven. Typical reinforcements used for the pultrusion process include continuous rovings, stitched, woven or knitted fabrics and continuous strand mats. In the continuous lamination process, chopped strands and chopped strand mats can be used in addition to the above-mentioned reinforcements. Preferred reinforcements for our prefabricated FRP are continuous rovings in the longitudinal direction of the FRP sheet and fabrics for transverse reinforcement. The fabrics may also be designed to provide bidirectional structural properties.

The FRP is sanded or abraded on at least one major surface in order to provide a clean surface and uniform thickness to the FRP sheet for bonding to the wood member. The wood member is prepared by planing the major surfaces. Since planing produces a lesser degree of flatness than sanding, the planed board can be sanded at least on one surface to which the FRP is eventually bonded. The planed or sanded surface of the wood board is coated with a reactive hotmelt. Preferably, both the FRP and wood member are coated on their major surfaces with the adhesive. This provides improved bonds between the FRP and wood. Alternatively, only one of the two substrates may be coated with the reactive hotmelt. By coating on both surfaces, the chances of skipping any low spots on the FRP or wood would not be a significant problem during production. After the substrates are coated, they are joined together so that the edges of the FRP are laid within a predetermined distance from the edges of the wood member. The joined parts are pressed together by a series of rollers. Simultaneously, the parts are cooled by means of forced air. The process of coating the substrates and joining them is conducted in a continuous fashion to obtain a relatively high manufacturing speed.

The present invention provides a novel process for manufacturing composite wood flooring for use in truck trailers that is subjected to lift truck loads on the top side and water spray on the bottom side. The composite wood flooring consists of a plurality of composite boards each of which is composed of a wood member with a fiber reinforced polymer adhesively bonded to the bottom side of the wood member using reactive hotmelt adhesive. Since the top side of the composite wood flooring is composed of wood, many desirable features of wood such as slip resistance, abrasion resistance and nailing capability are preserved. The underlayer of the composite wood flooring provides improved fatigue strength and moisture protection to wood. Since the mechanical properties of the reinforced composite wood flooring are superior to those of the conventional wood flooring, the thickness of the composite wood floor can be reduced leading to lower floor weight in a trailer. Alternatively, the load carrying capacity of the trailer can be increased with a suitable composite floor while having little or no increase in the weight of the trailer.

The process of this invention particularly comprises a process of manufacturing a composite wood board for use with a plurality of such composite wood boards in a floor system of a vehicular trailer or container, wherein each composite board comprises a unitary wood member with an exposed wood top surface and a bottom surface substantially bonded to a continuous planar layer of fiber reinforced polymer rendering the bottom surface substantially non-exposed, the process comprising the steps of:

providing the wood member as a side-to-side or edge bonded plurality of wood segments in an approximately planar arrangement with a substantial majority of the wood segments having shaped coupling portions at ends thereof, which ends are engaged to form several randomly placed end joints in the wood member;

machining the bonded wood segments to produce a planar wood member with two opposing major surfaces and first and second side surfaces, said wood member having a length, width, thickness and longitudinal and transverse axes;

providing a planar layer of fiber reinforced polymer having two major surfaces and a length, width, thickness and longitudinal and lateral axes, said planar layer of fiber reinforced polymer comprising a thermosetting or a thermoplastic polymer and reinforcing fibers, with at least about 70% of the fibers of said fiber reinforced polymer extending in a direction substantially parallel to the longitudinal axis of the planar layer of fiber reinforced polymer;

altering at least one major surface of the planar layer of fiber reinforced polymer by sanding or abrasion to provide a uniform thickness and clean bonding surface to the planar layer of fiber reinforced polymer;

substantially aligning the longitudinal axis of the planar layer of fiber reinforced polymer with the longitudinal axis of the wood member and substantially continuously coating one or both of the machined major surface of the wood member and the altered major surface of the planar layer of fiber reinforced polymer with a reactive hotmelt adhesive, followed by joining of the planar layer of fiber reinforced polymer to the wood member and pressing of the joined surfaces together, causing substantially no squeeze-out of the adhesive through the end joints of the wood segments and causing substantially no heat related distortion of the wood member; and curing the adhesive under ambient conditions to bond the planar layer of fiber reinforced polymer to the wood member to produce a composite wood board;

whereby said substantially continuous planar layer of the fiber reinforced polymer bonded to the bottom surface of the wood member of the composite board resists pop-out of the wood segments at the coupling portions at the ends of the wood segments and improves one or more of the flexural modulus, strength and load carrying capacity of the composite wood board.

DETAILED DESCRIPTION OF THE PREFERRED EMBODIMENT

The reinforced composite wood flooring of the present invention is an improvement over conventional wood flooring of truck trailers in that it provides both moisture proofing and reinforcement to such flooring. In order to understand the benefits provided by the composite wood flooring, it is first necessary to understand the construction of conventional laminated wood flooring.

Figure 1:
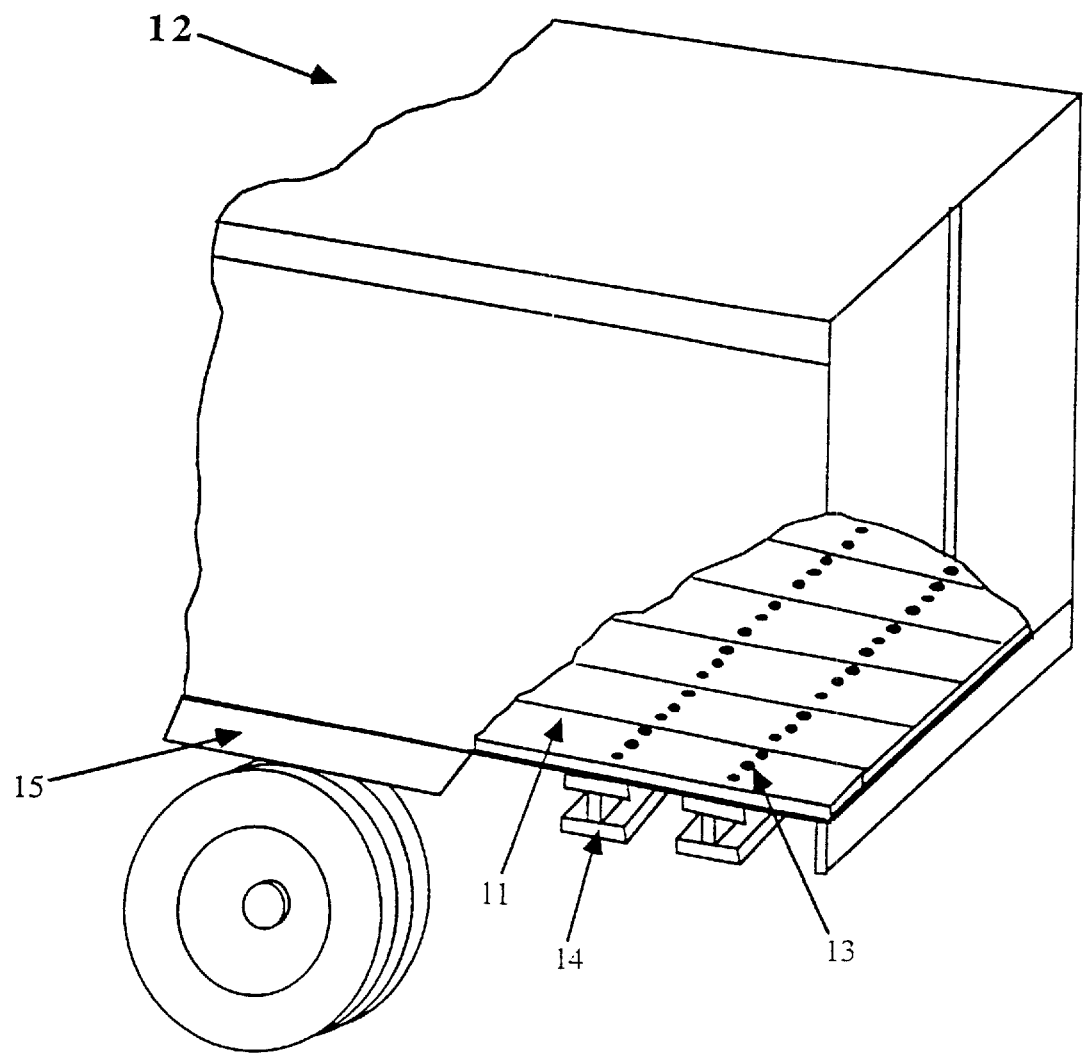
FIG. 1 is a perspective view of a van trailer showing the composite wood flooring installed on cross-members with an I-section.
Figure 4A:
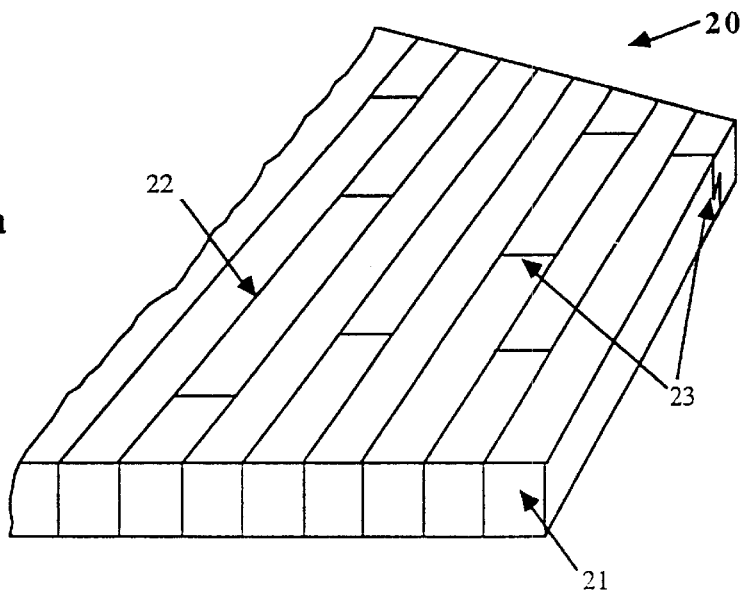
FIG. 4a is a perspective view of laminated wood with several randomly arranged hook joints.
Figure 4B:
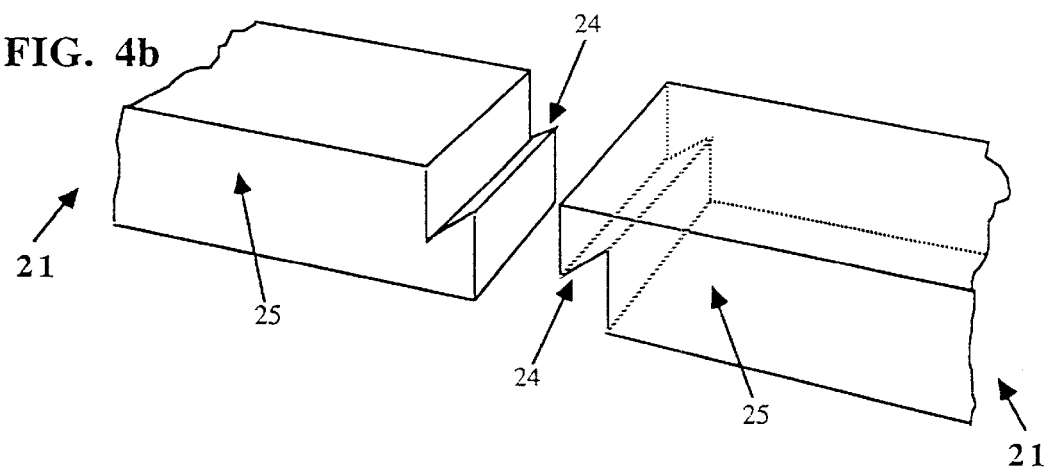
FIG. 4b is a perspective view of two opposing hooked ends of lumber strips.
Figure 4C:
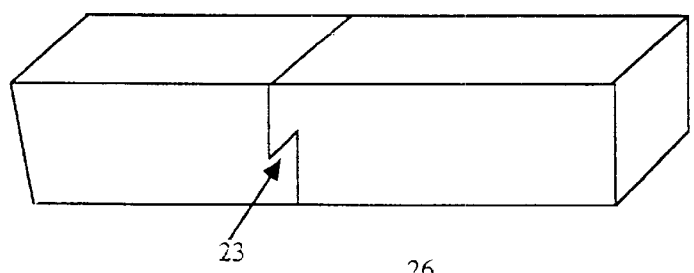
FIG. 4c is a perspective view of a perfect hook joint with little or no gap.
Figure 4D:
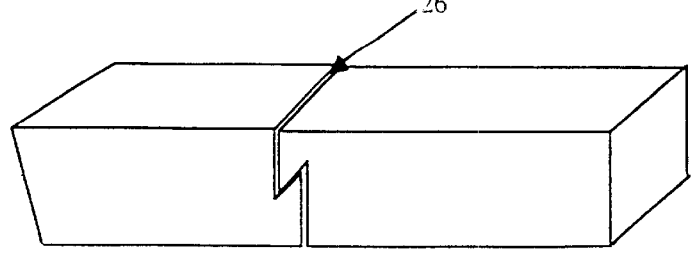
FIG. 4d is a perspective view of an imperfect hook joint with a significant gap.

Conventional wood flooring 11 for over-the-road truck trailers 12 such as that shown in FIG. 1 is normally manufactured with hardwoods such as ash, aspen, elm, yellow-poplar, and preferably oak, maple, birch, beech and the like, although softwoods such as Douglas fir and spruce could be employed. The green lumber used as a starting material in such manufacture is suitably dried in special drying chambers under controlled conditions. The dried lumber is then sawed into strips 21 of rectangular cross-section and defective portions are eliminated by cross cutting the strips. During the cross-cutting process, "hooks" 24 are formed at the ends of the lumber strips (see FIG. 4b). The relatively defect-free lumber strips are coated on their vertical sides or edges 25 with an adhesive such as urea-melamine formaldehyde or polyvinyl acetate. The uncured edge-glued lumber strips are then assembled on a conveyor by placing them side to side and behind other strips which were previously assembled forming glue lines 22 between adjacent strips 21. The adhesive is cured by applying heat and edge pressure to large sections of the assembled lumber strips thus forming a unitary panel of laminated wood 20 such as that shown in FIG. 4a. During the assembly of the lumber strips, "hook joints" 23 are formed at each end of every strip (see FIG. 4c). These joints are simple mechanical couplings with no significant adhesive bonding. Often times, due to imperfect assembly, a readily visible gap 26 is formed at the hook joints which can be seen from the top and bottom surfaces of the completed laminated wood floor (see FIG. 4d).

Figure 2:
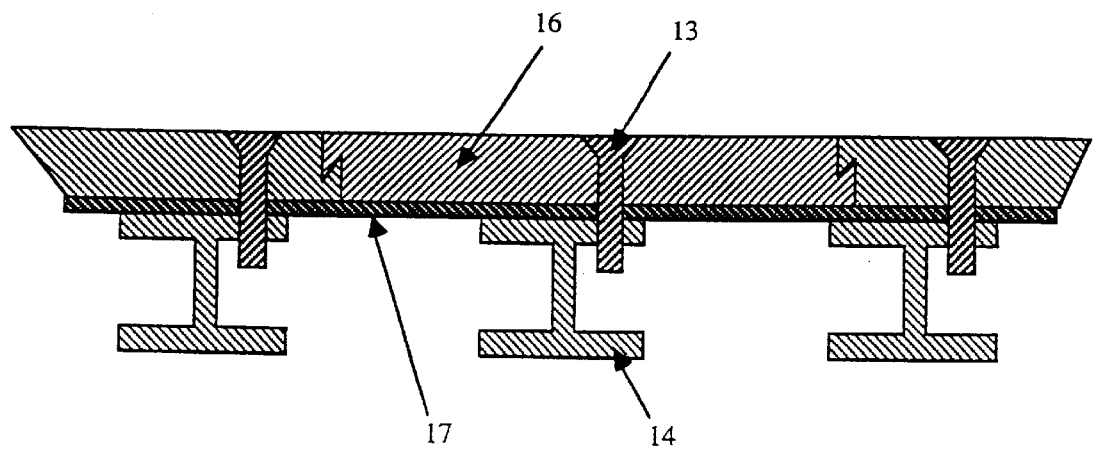
FIG. 2 is a longitudinal sectional view of a composite wood floor board fastened to cross-members of an l-section.
Figure 3:
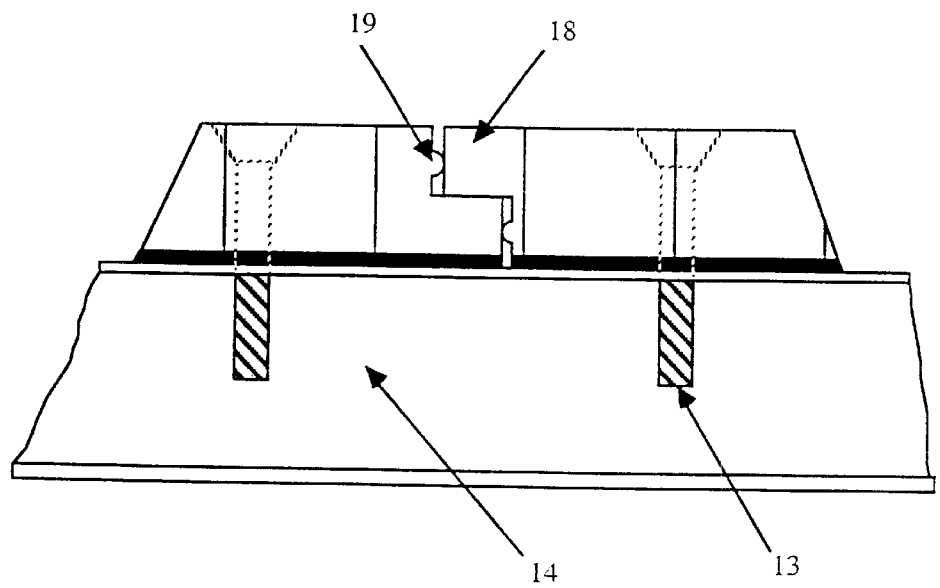
FIG. 3 is the end view of the shiplap assembly of two adjacent composite wood floor boards on an I-beam cross-member.
Figure 5:
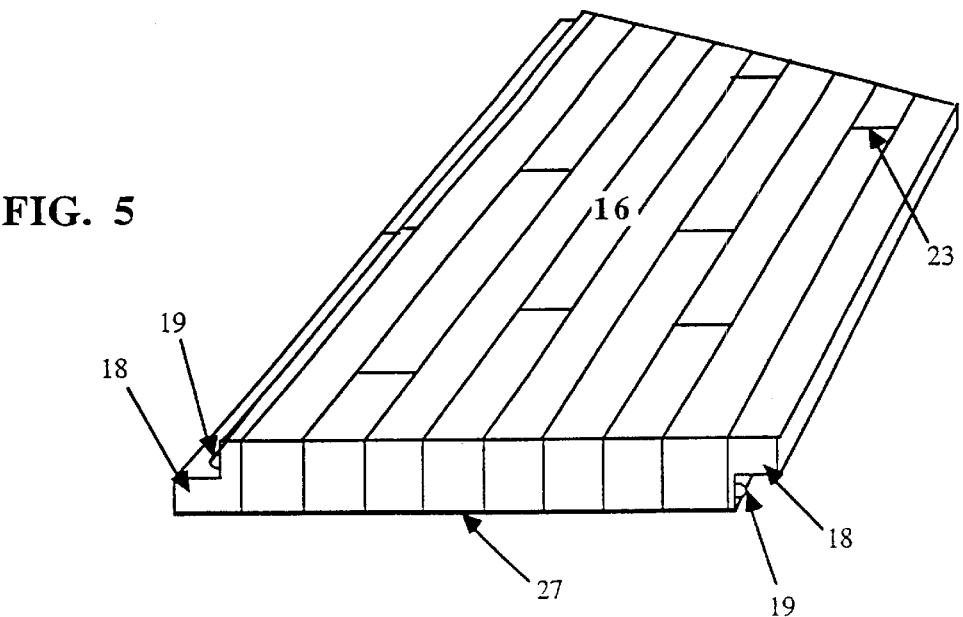
FIG. 5 is a perspective view of a conventional laminated wood floor board with shiplaps and crusher beads.

The cured laminated wood 20 is cut to a desired length (up to about 60 feet) and width (about 6 to 18 inches) and then machined to form several laminated wood boards 16 (see FIG. 5). Each laminated wood board 16 is planed to a desired thickness and shiplaps 18 and crusher beads 19 are machined on its sides. A shiplap 18 is a rectangular projecting lip running along the length on each side of a floor board. The crusher bead 19 is a small semi-circular projection running along the length on each side of a board and placed above or below a shiplap 18. When the floor boards are assembled in a trailer such that the side edges of corresponding boards are squeezed together, the shiplaps 18 of adjacent boards overlap to form a seam. The crusher bead 19 provides spacing between adjacent boards and help in preventing buckling of the boards when they expand on absorbing moisture. A wood putty is applied at the hook joints 23 on the top and bottom surfaces of the boards to fill any resident gaps. Finally, the underside of the floor boards are coated with a polymeric substance termed as "undercoating" 27 (FIG. 5) to provide moisture protection. The finished floor boards are assembled into a kit of about eight boards for installation in trailers. Normally, a kit consists of two boards with special shiplaps so that they will fit along the road and curb sides 15, which are usually metallic components of the trailer 12. The other boards may be identical in design and they are placed between the road and curb side boards. In some trailers, a metallic component such as a hat-channel may be placed between any two adjacent boards. The metallic component becomes part of the floor area. The boards adjacent to the hat-channel have side edge profiles designed to mate with the flanges of the hat-channel. All the boards are supported by thin-walled cross-members 14 of I, C or hat sections, each having an upper flange, which span the width of the trailer and are spaced along the length of the trailer. Each floor board is secured to the cross-members by screws 13 extending through the thickness of the board and the flanges of the cross-members (See FIGS. 1–3).

Figure 6:
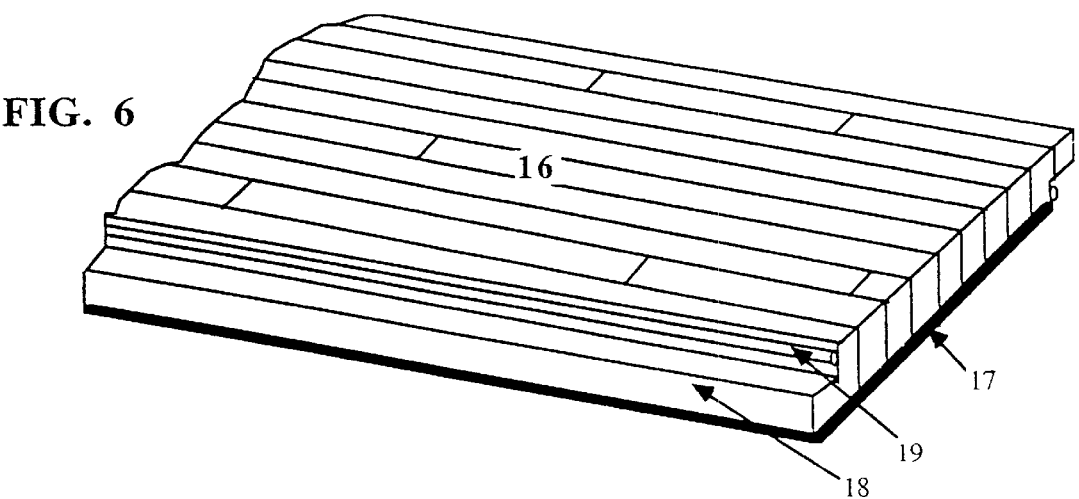
FIG. 6 is a perspective view of a reinforced composite wood floor board with shiplaps and crusher beads.

The reinforced composite wood floor board 28 improves the above described construction of conventional wood floor board 16 by reinforcing and moisture proofing a laminated wood member 16 with a layer of fiber reinforced plastic (FRP) 17 (as representatively shown in FIG. 6). Two basic designs of the composite wood floor board 28 of the invention with laminated wood member 16 on top and FRP 17 on the bottom are presented below. These designs differ from one another in the width of the FRP as related to the face width of the wood member.

Figure 7:
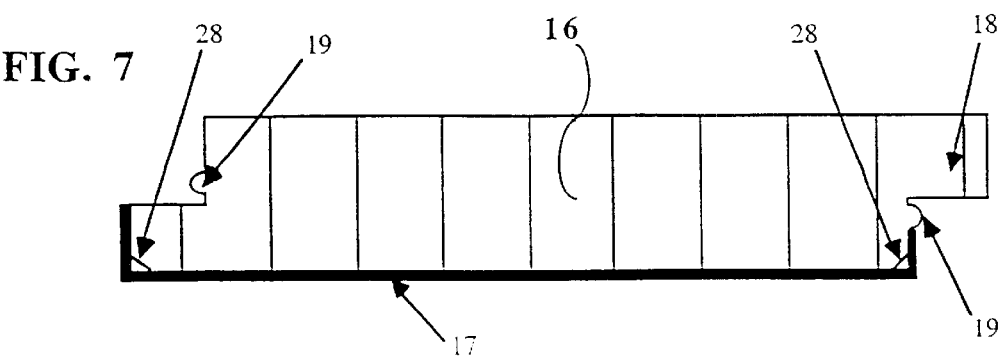
FIG. 7 is a sectional view of a reinforced composite wood floor board of a first embodiment of the invention.

As shown in FIG. 7, the reinforced composite wood floor board 28 consists of a laminated wood member 16 with an underlayer of FRP 17. The shiplaps 18 and crusher beads 19 are incorporated on the sides of the reinforced composite wood floor board 28 similarly to those in a conventional laminated wood floor board (FIG. 5). The finished width of the FRP 17 is nearly equal to the face width of the wood member 16. During manufacturing, the starting width of the FRP is selected to be equal or slightly wider than the face width of the board. After bonding the FRP to the board, the corners are machined so that the FRP does not overhang the face width of the board.

Figure 8:
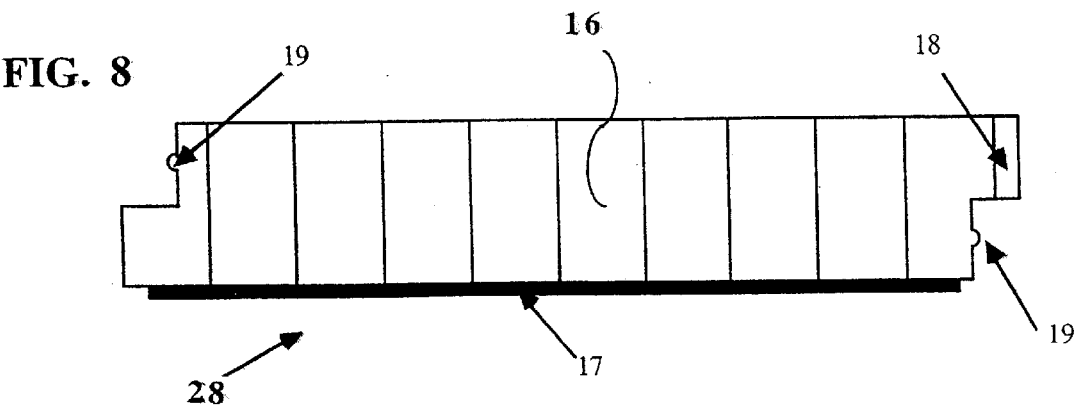
FIG. 8 is a sectional view of a reinforced composite wood floor board of a second embodiment of the invention.
Figure 9A:
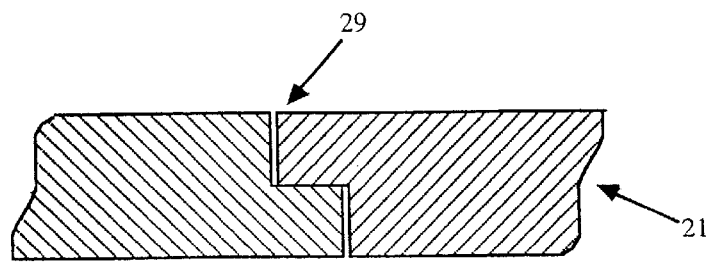
FIG. 9a is a sectional view of a lap joint between two lumber strips.
Figure 9B:
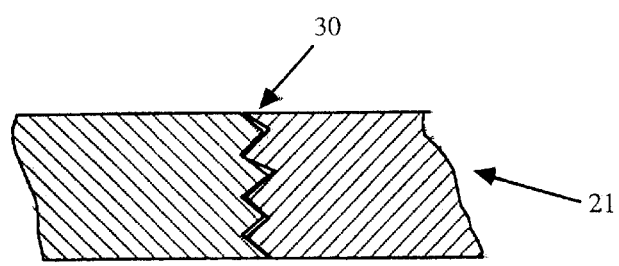
FIG. 9b is a sectional view of a finger-joint between two lumber strips.
Figure 9C:
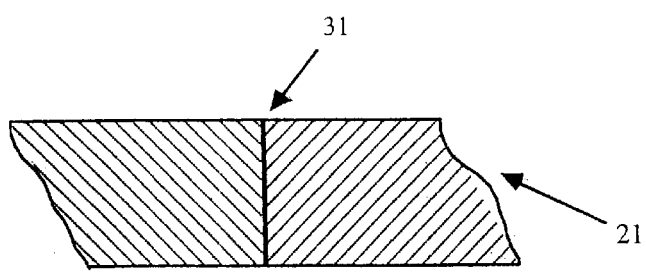
FIG. 9c is a sectional view of a buff joint between two lumber strips.
Figure 9D:
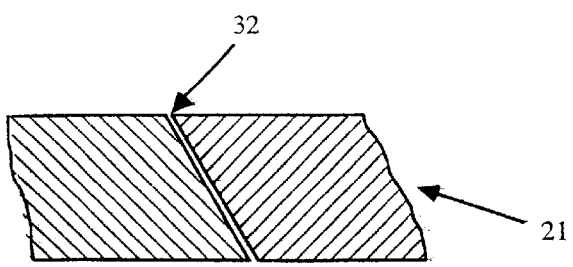
FIG. 9d is a sectional view of a scarf joint between two lumber strips.

The embodiment of FIG. 8 differs slightly from that of FIG. 7. In this case, the FRP 17 has a narrower width than the face width of the wood member 16. At each of the lateral sides of the board, the edge of the FRP is at least 1/64" inside the edge of the wood member. By bonding the FRP to the wood member at the correct location relative to the edges of the board, final machining of the lateral sides of the composite floor board is avoided.

Figure 10A:
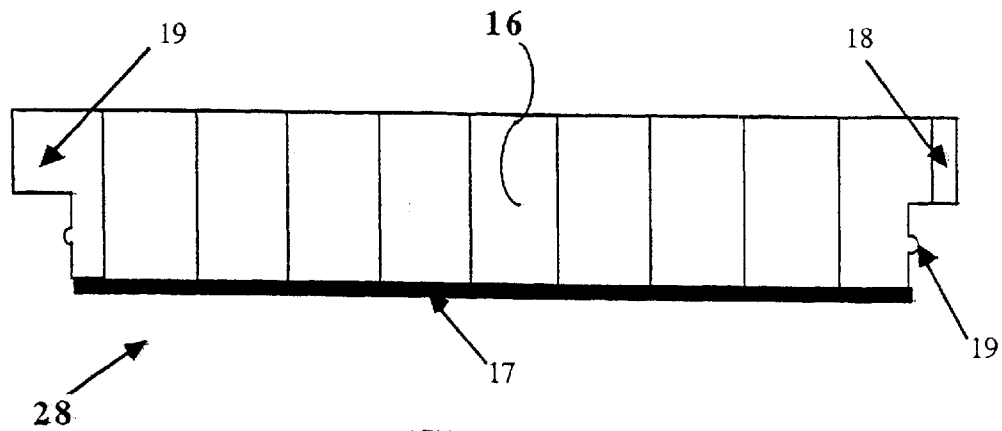
FIG. 10a is a sectional view of a reinforced composite wood floor board with two shiplap edges having bottom cuts.
Figure 10B:
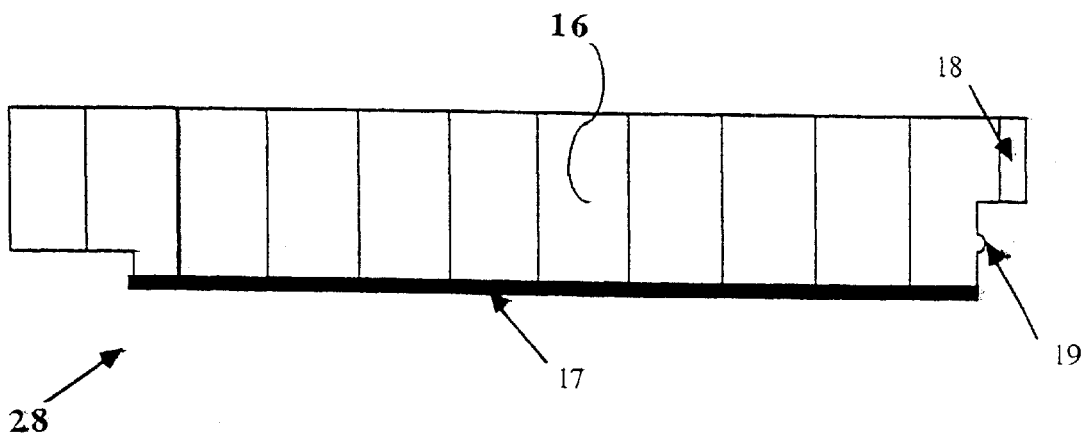
FIG. 10b is a sectional view of a reinforced composite wood floor board with a shiplap edge having a shallow bottom cut.

A laminated wood member 16 with shiplaps 18 and crusher beads 19 is fabricated by the process set forth above for producing conventional laminated wood floor boards. However, the wood member is not coated with an undercoating and the hook joints are not coated with a wood putty. If required, each hook joint at the ends of the lumber strips is substituted with a lap joint 29 or a finger joint 30 or a butt joint 31 or a scarf joint 32 as illustrated in FIGS. 9a to 9d. In addition to using a wood member with edge profiles to produce a composite board as shown in FIG. 6, other types of profiles are used to produce composite boards as shown in FIGS. 10a and 10b.

The FRP is fabricated with continuous fibers in the form of continuous rovings and fabrics. About 70% to about 100% of the fiber reinforcement are aligned along the longitudinal direction while the remaining fibers are aligned along the lateral direction of the FRP. The reinforcing fibers are glass, carbon or aramid fibers or mixtures thereof. Glass fiber is more economical than carbon and aramid fibers, but provides lower weight savings and flexural modulus than the other fibers. For higher performance, carbon fiber is better suited to reinforce wood. Mixtures of glass and carbon fibers can also be used to improve performance at moderate costs.

Epoxy resin is the preferred matrix for the fabrication of the FRP. Other thermoset and thermoplastic polymers such as vinyl ester, phenolic, polyester, polypropylene and polyamide can be used to fabricate the FRP. The method of fabrication of the FRP is dictated by the type of polymer selected. Conventional pultrusion and continuous lamination processes are better suited for thermosetting resins. Typically, in these processes the reinforcing fibers are placed under tension and wetted with a reactive liquid resin, which is subsequently cured around the fibers. To fabricate the FRP with a thermoplastic polymer, the fibers are coated with the polymer and then the coated fibers are consolidated under he at and pressure followed by cooling. Alternatively, co-mingled fibers of reinforcement and thermoplastic polymer can be used to form the FRP. Irrespective of the fabrication process of the FRP, the FRP for composite wood flooring is preferably designed to have 70% to 100% of the continuous fibers aligned along the longitudinal direction while the remaining fibers are aligned along the lateral direction of the FRP. The FRP sheet is preferably sanded or abraded on at least one side to render it flat and clean for bonding to the wood member.

The laminated wood member with shiplaps and other edge details is sanded or abraded on one side to develop a flatter surface than that provided by planing. Alternatively, a knife-planed surface of the wood member can be used for bonding to the FRP. A reactive hotmelt adhesive is coated on the sanded or planed surface of the board. Preferably, the sanded surface of the FRP is also coated with the reactive hotmelt. Commercially available hotmelt roller coaters are used to coat the substrates with the reactive hotmelt Typical weight of coating on any one substrate is about 5 to 20 gms/sq ft. The reactive hotmelt is applied on the substrates in a molten state at a temperature generally in the range of about 200° F. to 350° F.

Prior to bonding, the edges of the FRP are aligned with respect to the edges of the wood member. To manufacture a composite floor board of Embodiment I, the width of the FRP is selected to be equal or wider than the face width of the wood member. After bonding the FRP to the wood member, the FRP is either in line with or overhanging the edges of the wood member. In case of an overhanging FRP on the wood member, a secondary machining operation is employed to trim the FRP and wood. Since glass and carbon fibers are hard to machine than wood, a softer fiber such as polyester or cellulose is employed at the edges of the FRP during its fabrication. To manufacture a composite floor board of Embodiment II, the width of the FRP is selected to be at least 1/16" less than the face width of the wood member. The edges of the FRP are aligned with respect to the edges of the wood member such that there is no overhang of the FRP over the edges of the wood member.

The coated surface of the FRP is mated with the coated surface of the wood member while maintaining proper alignment of the edges of the board and FRP. The joining of the FRP and wood member is done while the reactive hotmelt coating is in a tacky state. In case of a short open time of the reactive hotmelt, to maintain the tacky state of the coating, radiant heat is applied on the bonding surface of the FRP and wood member before or after the coating step. After the joining of the FRP and wood board, a series of rollers are used to apply pressure on the substrates. Cooled air is blown over the substrates while pressure is applied to remove residual heat of the substrates and develop green strength of the bond. Quick development of green strength helps to hold the FRP flat against the wood board and prevents debonding at the edges.

To manufacture the composite floor boards in a continuous fashion, a series of wood members of desired length and edge profiles are run one behind the other. The FRP is drawn from a roll of material and continuously joined to the boards as the boards pass below the roll. After joining the FRP and wood members, the FRP is cut between the ends of two boards next to each other. The cutting of the FRP is done by means of an automatic cut-off saw without stopping the flow of the boards.

A 10 foot long composite wood floor kit consisting of eight composite boards was fabricated by bonding a glass/epoxy FRP to each of the eight laminated wood members using commercially available polyurethane reactive hotmelt, namely PUR-FECT LOK 34-9028 of National Starch and Chemical Company. The laminated wood was made of red and white oak strips which were edge-glued using urea-melamine formaldehyde adhesive. The fiber reinforcement of the FRP was composed of about 50 oz/sq yd of continuous glass rovings in the longitudinal direction of the FRP. A fabric weighing about 4 oz/sq yd of glass fibers oriented in the weft direction was used for transverse reinforcement. Wood members having a rectangular cross-section and without any shiplaps were used. The planed surface of the wood members and the sanded surface of the FRP sheets were coated with a reactive hotmelt. Upon joining and pressing of the substrates with rollers, the composite boards were allowed to cure at ambient conditions for five days. The boards were then machined to provide the required shiplap profiles and crusher beads at the longitudinal edges. The finished thickness of the reinforced composite wood floor was about 1.125 inches.

Eight composite floor boards were installed in a partial section of a trailer. The floor was supported by several I-beam cross-members running along the full width of the trailer and regularly spaced at 12 inches along the length of the trailer section. The cross-members with a section of 4 inches by 2.25 inches were made of steel with a yield strength of 80 ksi and weighing about 3.2 lbs/foot. Each floor board was secured to each cross-member in the test section by three screws running through the thickness of the boards and the top flange of the cross-member. A lift truck load simulator with two loading wheels was stationed on the floor. The simulator was loaded with dead weights so that a force of about 17,000 lbs could be applied on the floor through the loading wheels. The loading wheels were stationed on the third and sixth boards in the eight board configuration of the floor. To subject the floor to fatigue loading, the simulator was moved back and forth on the floor. The simulator was allowed to complete 5,000 fatigue loading cycles, wherein during each cycle the simulator moved forward in one direction and then returned back to its starting line on the floor. At the end of 5,000 fatigue loading cycles, the reinforced composite floor experienced little or no significant damage. The loading wheels were repositioned on the first and fourth board and the fatigue test was redone for another 5000 cycles. Since the damage to the composite floor boards was not significant, the fatigue test was continued at 20,000 lbs of loading on the same set of floor boards. The loading wheels were positioned in two different locations as described above and an additional 10,000 fatigue load cycles were applied. There was no catastrophic damage to the floor boards and cross-members at any time during the test.

A conventional hardwood floor with a nominal thickness of 1.38" supported by standard cross-members at 12" spacing is rated for 17,000 lbs by the trailer industry. During fatigue testing, the conventional hardwood floor typically undergoes cracking of some wood segments and opening of some hook joints at the bottom side of the floor. The mechanical properties of conventional hardwood flooring show a large variation due to the random location of joints and variation of properties of the wood segments.

Compared to the conventional floor boards, the composite floor boards show superior performance with little or no opening of the joints of the wood segments at the bottom side of the floor. The composite floor boards show significantly lower variation of mechanical properties due to the strengthening of the hook joints and better distribution of load to the tensile bottom side of the floor. The thinner composite floor of this experiment weighed about 4.8 lbs/sq ft, while the thicker conventional oak floor weighed about 5.4 lbs/sq ft. Thus, the composite floor provides weight saving over the conventional hardwood floor while providing similar load capacity. By using carbon fibers or mixtures of carbon and glass fibers in a continuous roving form along the longitudinal direction of the FRP, additional weight saving and even higher performance can be obtained.

Since the underside of the trailer flooring is subjected to water spray in service, the environmental durability and aged properties of the floor is of importance to the long term performance of the floor. To determine the weathering characteristics of the floor boards the following accelerated environmental test was conducted. Samples of composite floor boards with a thickness of 1" and conventional laminated oak floor boards with a thickness of 1.31" were tested. The sample boards with a length of about three feet and width of about 12" were fastened with screws to steel frames built with cross-members used in trailers to support the floor. The attachment of the boards to frames simulated a section of a single floor board of a trailer. The boards, which were attached to the frames were degraded by immersing them in water for seven days and then drying them in a kiln at about 140° F. to 160° F. for two days. The soaking and drying cycle was repeated once more. Finally, the boards were removed from the frames and subjected to bend test to determine the loss of ultimate failure load. It was found that the conventional oak floor suffered a loss of ultimate failure load from 5200 lbs for the virgin boards to 3980 lbs for the degraded boards. On the other hand, the composite floor boards fabricated with glass/epoxy FRP and reactive hotmelt adhesive suffered a loss of ultimate failure load from 5920 lbs for the virgin boards to 4690 lbs for the degraded boards. Further, conventional wood floor boards failed in a relatively brittle mode. The composite wood floor boards failed in a ductile fashion with little or no debonding of the FRP and without opening of the hook joints at the bottom side. The ductile failure mode and integrity of the composite boards provides higher performance to trailer floor.

With the foregoing description of the invention, those skilled in the art will appreciate that modifications may be made to the invention without departing from the spirit thereof. Therefore, it is not intended that the scope of the invention be limited to the specific embodiments illustrated and described.

I claim:

1. A process of manufacturing a composite wood board for use with a plurality of such composite wood boards in a flooring system of a vehicular trailer or container, wherein each composite board comprises a unitary wood member of a plurality of wood segments and having a top surface and a bottom surface, the process comprising the steps of:

providing the wood member with two opposing major surfaces;

providing a water impervious layer;

altering at least one major surface of the water impervious layer to provide a bonding surface to the water impervious layer;

substantially aligning a longitudinal axis of the water impervious layer with a longitudinal axis of the wood member and substantially continuously coating at least one or both of a major surface of the wood member and the at least one altered major surface of the water impervious layer with a reactive hotmelt adhesive, followed by joining of the water impervious layer to the wood member and pressing of the joined surfaces together, and curing the adhesive under ambient conditions to bond the water impervious layer to the wood member to produce a composite wood board.

2. The process according to claim 1 wherein the impervious layer comprises a planar layer of fiber reinforced polymer comprising a thermosetting or a thermoplastic polymer and reinforcing fibers.

3. The process according to claim 2 wherein about 70% to 90% of the fibers of the fiber reinforced polymer extend in a direction substantially parallel to a longitudinal axis of the layer of fiber reinforced polymer.

4. The process of claim 1, wherein said altering is by sanding or abrasion.

5. The process of claim 2, wherein said planar layer of fiber reinforced polymer comprises continuous rovings of glass or carbon or aramid fibers or mixtures thereof impregnated by a polymeric resin.

6. The process of claim 2, wherein said wood is a hardwood selected from the group consisting of ash, yellow-poplar, elm, oak, maple, birch and beech.

7. The process of claim 2, wherein the reactive hotmelt adhesive is coated on both the major surface of the wood member and the altered major surface of the planar layer of fiber reinforced polymer.

8. The process of claim 2, wherein said planar layer of fiber reinforced polymer comprises rovings of continuous fibers impregnated by a polymeric resin.

9. The process of claim 2, wherein said planar layer of fiber reinforced polymer comprises one or more fabrics of reinforcing fibers, which fabric is selected from the group consisting of woven rovings, stitched fabrics, and knitted fabrics.

10. The process of claim 2, wherein the planar layer of fiber reinforced polymer comprises a combination of continuous rovings and one or more fabrics of reinforcing fibers impregnated by a polymeric resin.

11. The process of claim 2, wherein said planar layer of fiber reinforced polymer comprises one or more strand mat impregnated by a polymeric resin.

12. The process of claim 2, wherein said planar layer of fiber reinforced polymer comprises glass or carbon or aramid fibers or mixtures thereof.

13. The process of claim 2, wherein the polymer of the planar layer of fiber reinforced polymer is selected from polymers of the group consisting of vinyl ester, polyester, epoxy, phenolic, polypropylene, and polyamide polymers.

14. The process of claim 1, wherein a major surface of the wood member is knife-planed or sanded or abraded to provide a bonding surface to bond the planar layer of fiber reinforced polymer.

15. The process of claim 14, wherein the knife-planed, sanded or abraded major surface of the wood member is coated with the reactive hotmelt adhesive.

16. The process of claim 14, wherein the altered major surface of the planar layer of fiber reinforced polymer is coated with the reactive hotmelt adhesive.

17. The process of claim 2, wherein the edges of the composite board are machined to trim the planar layer of fiber reinforced polymer.

18. The process of claim 2, wherein edges of the wood member are machined to form shiplaps and crusher beads.

19. The process of claim 2, wherein the reactive hotmelt adhesive is coated on both the major surface of the wood member and the altered major surface of the planar layer of fiber reinforced polymer.

20. The process of claim 1, wherein the hotmelt adhesive is heated to a temperature of from about 200° F. to about 350° F. before coating on one or both of the major surfaces.

21. The process of claim 2, wherein the hotmelt adhesive is heated to a temperature of from about 200° F. to about 350° F. before coating on one or both of the major surfaces.

22. The process of claim 2, wherein the major surfaces of the wood member and the planar layer of fiber reinforced polymer to be joined together by the hotmelt adhesive are warmed to a temperature of from about 60° F. to about 200° F.

23. The process of claim 1, wherein the reactive hotmelt adhesive is coated on one or both major surfaces of the wood member and the water impervious layer in an amount of about 5 to about 20 gms/sq ft of surface.

24. The process of claim 1, wherein the reactive hotmelt adhesive is a polyurethane hotmelt adhesive.

25. The process of claim 2, wherein the reactive hotmelt adhesive is a polyurethane hotmelt adhesive.

26. A composite wood board produced according to the process of claim 1.

27. A composite wood board produced according to the process of claim 25.

28. A process of manufacturing a composite wood board for use with a plurality of such composite wood boards in a flooring system of a vehicular trailer or container, wherein each composite board comprises a unitary wood member with an exposed wood top surface and a bottom surface substantially bonded to a continuous water impervious layer rendering the bottom surface substantially non-exposed, the process comprising the steps of:

providing the wood member having two opposing major surfaces;

providing a water impervious layer;

bonding the water impervious layer to the wood member to produce a composite wood board by substantially continuously coating one or both of a major surface of the wood member and a major surface of the water impervious layer with an adhesive, followed by joining of the water impervious layer to the wood member.

29. The process of claim 28, wherein the water impervious layer comprises a layer of fiber reinforced polymer of a thermosetting or thermoplastic polymer and reinforcing fibers.

30. The process of claim 29 wherein about 70% to 90% of the fibers of the fiber reinforced polymer extend in a direction substantially parallel to a longitudinal axis of the layer of fiber reinforced polymer.

31. The process of claim 28 wherein at least one of a first side surface and a second side surface of the wood member is provided with an upper lip portion or a lower lip portion to allow the joining of two composite boards with mating profiles of side surfaces to form an extended planar surface of a vehicular trailer or container floor.

32. The process of claim 31, wherein at least one of said first side surface and said second side surface of the wood member is further provided with a bead to allow the formation of a gap between two composite boards placed adjacent to each other with side profiles of each engaging each other in a vehicular trailer or container floor.

33. The process of claim 29, wherein said layer of fiber reinforced polymer comprises continuous rovings of glass or carbon or aramid fibers or mixtures thereof impregnated by a polymeric resin.

34. The process of claim 28, wherein said wood is a hardwood selected from the group consisting of ash, yellow-poplar, elm, oak, maple, birch and beech.

35. The process of claim 34, wherein one of the major surfaces of the wood member is machined, at least one major surface of the water impervious layer is altered to provide a bonding surface, the adhesive is a reactive hot met adhesive and the reactive hotmelt adhesive is coated on both the machined major surface of the wood member and the altered major surface of the water impervious layer.

36. A composite wood board produced according to the process of claim 28.

37. A process of manufacturing composite wood board for use with a plurality of such composite wood boards in a flooring system of a vehicular trailer or container, wherein each composite board comprises a unitary wood member of a plurality of wood segments and having a wood top surface and a bottom surface substantially bonded to a continuous planar layer of fiber reinforced polymer rendering the bottom surface substantially non-exposed, the process comprising the steps of:

providing the wood member with two opposing major surfaces;

providing a planar layer of fiber reinforced polymer having two major surfaces and a length, width, thickness and longitudinal and lateral axes, said planar layer of fiber reinforced polymer comprising a thermosetting or a thermoplastic polymer and reinforcing fibers, with about 70% to 90% of the fibers of said fiber reinforced polymer extending in a direction substantially parallel to the longitudinal axis of the planar layer of fiber reinforced polymer;

altering at least one major surface of the planar layer of fiber reinforced polymer to provide a bonding surface to the planar layer of fiber reinforced polymer;

substantially aligning the longitudinal axis of the planar layer of fiber reinforced polymer with a longitudinal axis of the wood member and substantially continuously coating at least one or both of a major surface of the wood member and the at least one altered major surface of the planar layer of fiber reinforced polymer with a reactive hotmelt adhesive, followed by joining of the planar layer of fiber reinforced polymer to the wood member and pressing of the joined surfaces together, and curing the adhesive under ambient conditions to bond the planar layer of fiber reinforced polymer to the wood member to produce a composite wood board.

38. A process of manufacturing a composite wood board for use with a plurality of such composite wood boards in a flooring system of a vehicular trailer or container, wherein each composite board comprises a unitary wood member with an exposed wood top surface and a bottom surface substantially bonded to a continuous planar layer of fiber reinforced polymer rendering the bottom surface substantially non-exposed, the process comprising the steps of:

provinding the wood member having two opposing major surfaces, first and second side surfaces, length, width, thickness and longitudinal and transverse axes;

providing a planar layer of fiber reinforced polymer having two major surfaces and a length, width, thickness and longitudinal and lateral axes, said planar layer of fiber reinforced polymer comprising a thermosetting or a thermoplastic polymer and reinforcing fibers, with about 70% to 90% of the fibers of said fiber reinforced polymer extending in a direction substantially parallel to the longitudinal axis of the planar layer of fiber reinforced polymer;

bonding the planar layer of fiber reinforced polymer to the wood member to produce a composite wood board by substantially continuously coating one or both of a major surface of the wood member and a major surface of the planar layer of fiber reinforced polymer with an adhesive, followed by joining of the planar layer of fiber reinforced polymer to the wood member.

* * * * *